Figure 1:
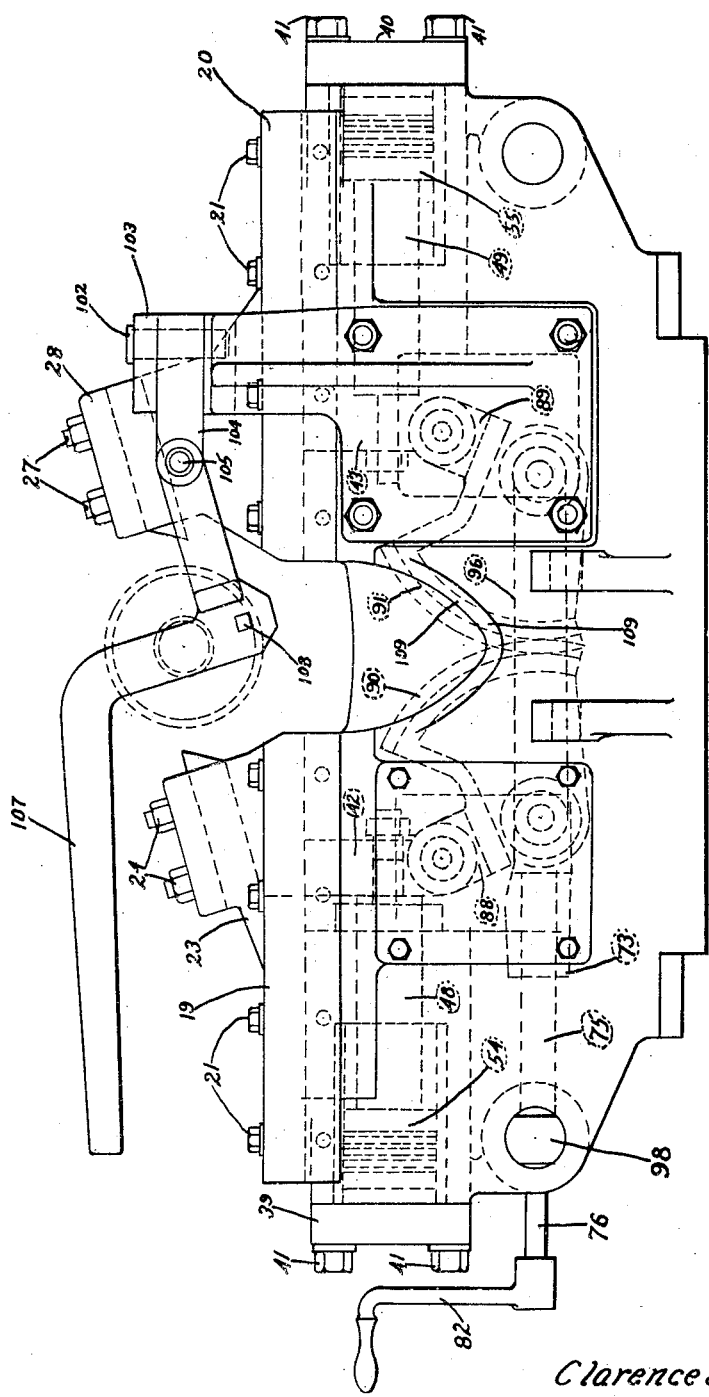

Oct. 18, 1932.  C. L. TAYLOR  1,883,093
MACHINE FOR CUTTING OFF PIPE AND THE LIKE
Filed Dec. 7, 1929   6 Sheets-Sheet 1

INVENTOR.
Clarence L. Taylor
BY
Fay, Oberlin & Fay
ATTORNEYS.

Oct. 18, 1932.                C. L. TAYLOR                 1,883,093
MACHINE FOR CUTTING OFF PIPE AND THE LIKE
Filed Dec. 7, 1929            6 Sheets-Sheet 4

INVENTOR.
Clarence L. Taylor
BY
Fay, Oberlin & Fay
ATTORNEYS.

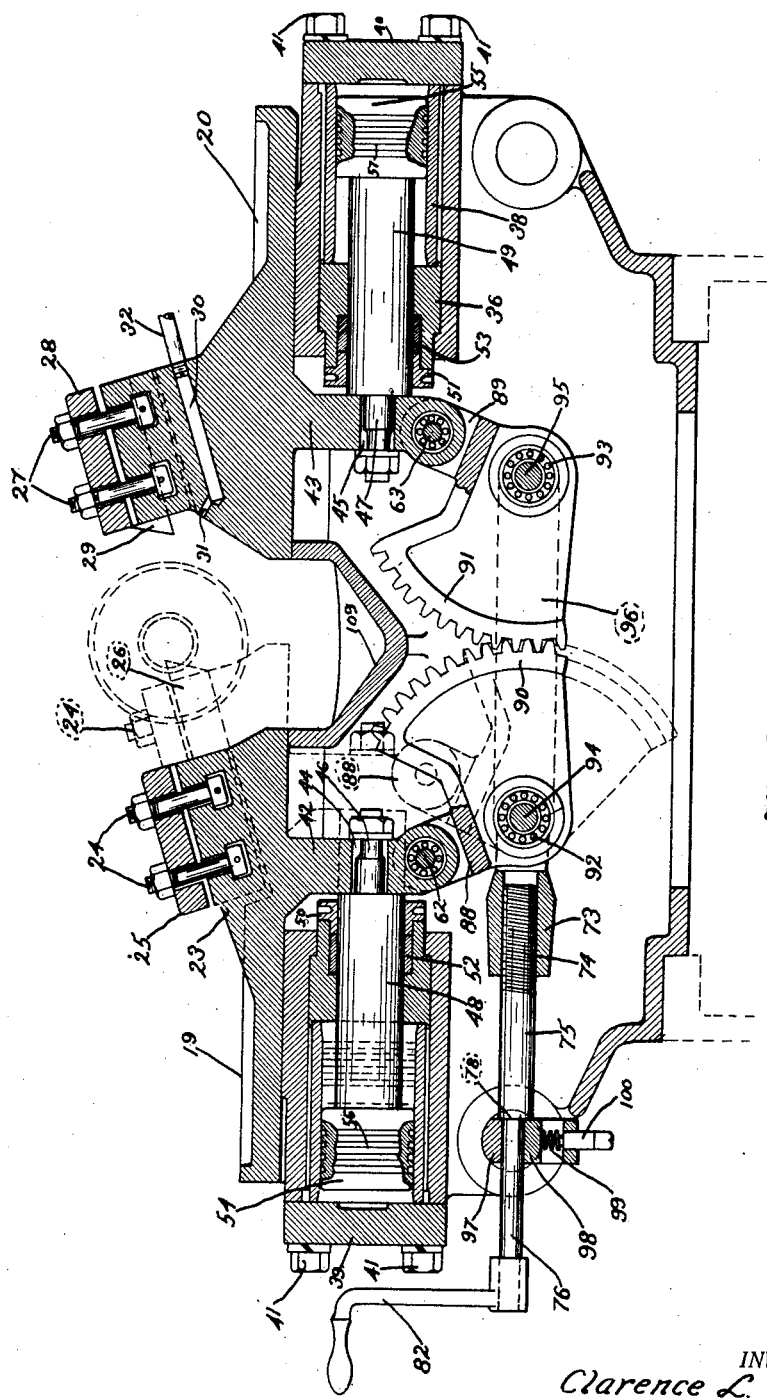

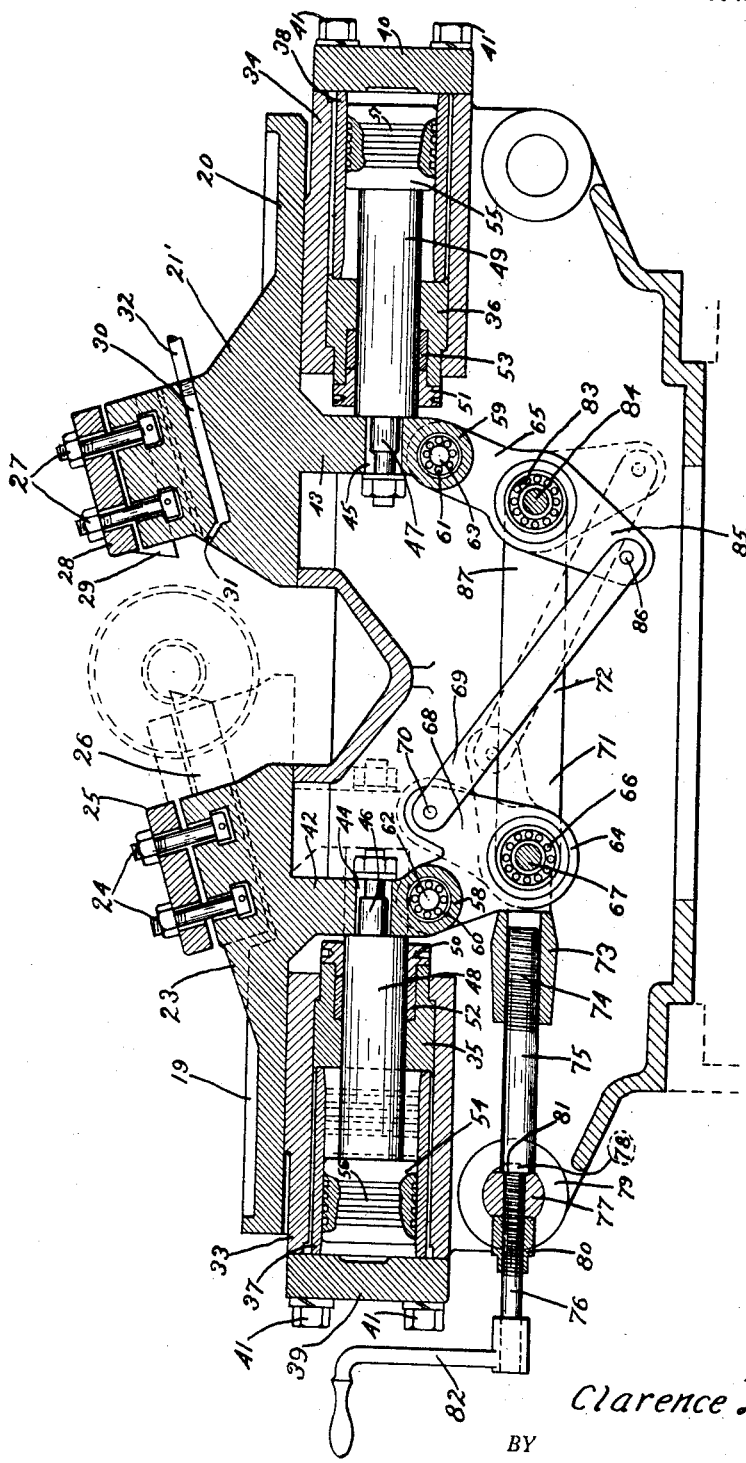

Patented Oct. 18, 1932

1,883,093

UNITED STATES PATENT OFFICE

CLARENCE L. TAYLOR, OF YOUNGSTOWN, OHIO, ASSIGNOR TO THE AETNA-STANDARD ENGINEERING COMPANY, OF YOUNGSTOWN, OHIO, A CORPORATION OF OHIO

MACHINE FOR CUTTING OFF PIPE AND THE LIKE

Application filed December 7, 1929. Serial No. 412,347.

This invention relating, as indicated, to machines for cutting off pipe has specific reference to a machine for cutting off pipe or seamless tubes or other like cylindrical articles which are formed of unusually hard materials, such as high carbon steel or alloy, which cannot be readily cut by machines of the type now commonly employed, due to the fact that the cutting speed is different from that of ordinary iron pipe and also due to the fact that when cylindrical articles made of a relatively hard material are cut off it is inexpedient to use a positive drive for the feeding mechanism for the cutting tools. The manner in which pipes and like cylindrical articles are usually cut is to rigidly and revolubly support such articles and feed thereto the cutting tools at a predetermined speed. In feeding the cutting tool toward the article to be cut when such article is made of common grades of iron and steel it is possible to effect such feeding by means of a positive drive and at a predetermined rate, since the materials commonly used in the manufacture of such articles are relatively soft and readily adaptable to the usual conditions incidental to positive feed of the cutting tool. If, however, the iron, steel or alloy from which the cylindrical article is made is relatively hard the employment of a positive feed for the cutting tool is no longer expedient. The speed by which the harder metals can be cut is much less and varies to a greater extent than the speed with which the softer metals can be efficiently acted upon. A further desirable feature of a machine for cutting off cylindrical articles made of relatively hard material is that a plurality of cutting tools be employed, which tools are adapted to contact with the material at diametrically opposite points and thereby relieve the cutting mechanism from a considerable portion of the operative stresses.

When diametrically opposed cutting tools are employed to cut off a cylindrical article made of a relatively hard material some means must also be provided for coaxially adjusting the cutting tools with the cylindrical article to be cut, as well as a means for equalizing the pressure of each of the cutting tools with the article acted upon, in order that the cutting operation be carried out with the greatest amount of efficiency.

It is therefore an object of my invention to provide a machine for cutting off pipe and like cylindrical articles which shall employ diametrically opposed cutting tools acting upon the article to be cut, which article is rigidly and revolubly supported by a portion of the machine, and the cutting tools maintained in communication with the revolving article with equal degrees of pressure. A further object of my invention is to provide a machine for accomplishing the above outlined results, which machine shall be simple in construction and efficient in its operation from the standpoint of speed and the manner in which the work is accomplished. Other objects of my invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 2:
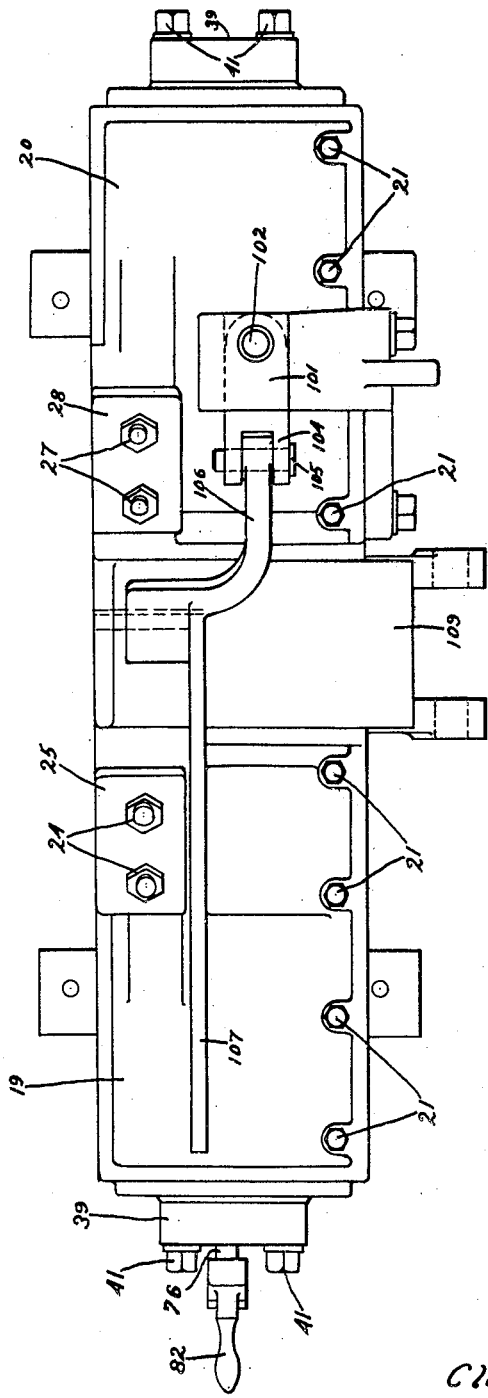
Figure 3:
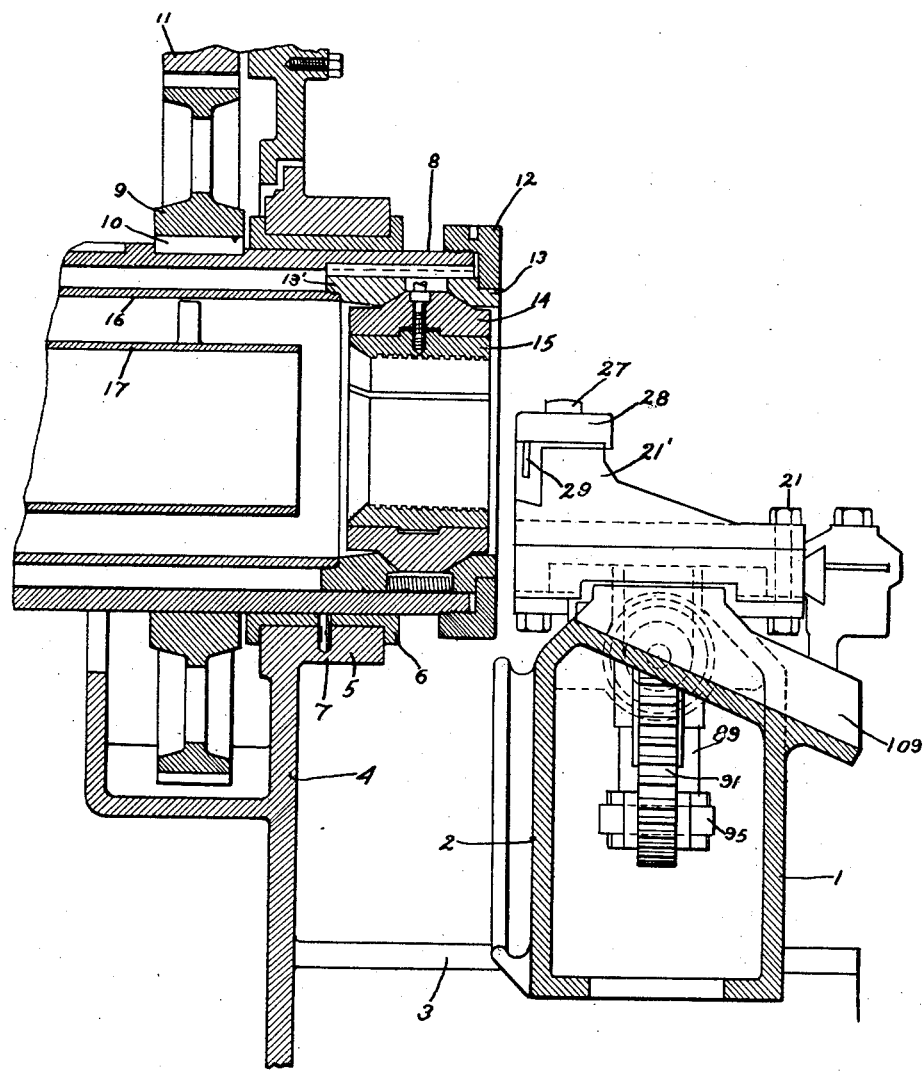
Figure 4:
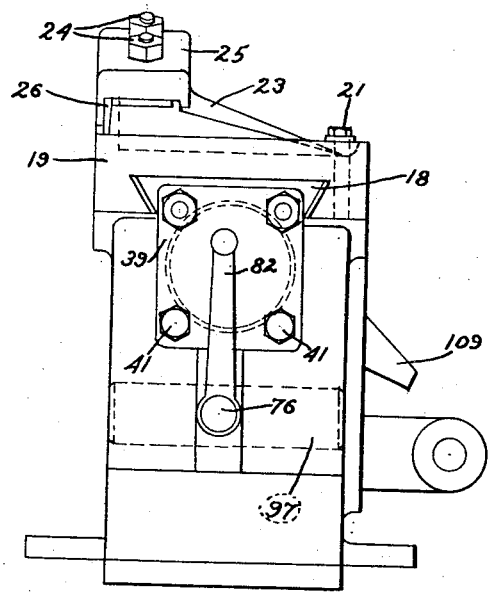
Figure 5:
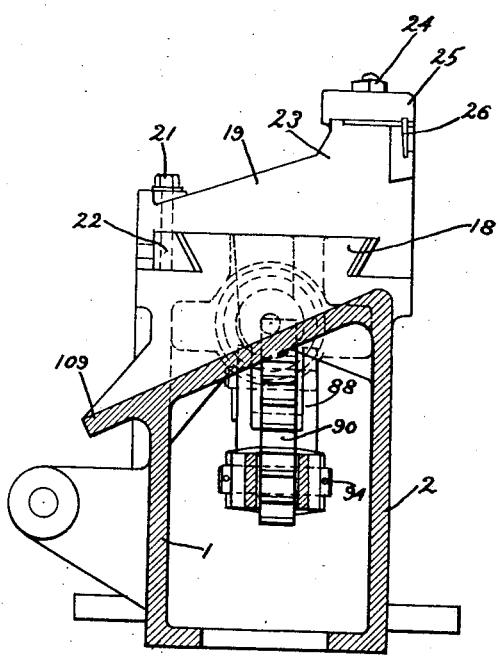

Fig. 1 is a side elevation of the mechanism comprising my invention; Fig. 2 is a plan view of this mechanism; Fig. 3 is a fragmentary part section part elevation of mechanism comprising my invention in association with mechanism for rigidly and revolubly supporting the article to be cut; Fig. 4 is an end elevation of mechanism comprising my invention; Fig. 5 is a transverse sectional view of the mechanism; and Figs. 6 and 7 are longitudinal sectional views of the mechanism showing alternative forms of construction.

Referring more specifically to the drawings, and more especially to Fig. 3, the machine comprising my invention is shown as consisting of side members 1 and 2 which support the machines on suitable brackets 3 which extend laterally from a supporting member 4, which is part of the pipe supporting structure. The frame member 4 has a reinforced projecting member 5 extending laterally therefrom which is adapted to receive the bushing 6, which is secured thereto by means of the pin 7. The bushing 6 revolubly supports a cylindrical member 8 which has secured thereto a gear 9 by means of the key 10. The gear wheel 9 is in driving communication with the drive wheel 11 and by which it is rotated, receiving its power from a source not shown. The cylindrical member 8 has terminally removably secured thereto a flange collar 12 which, through the beveled rings 13 and 13', is utilized to maintain the jaws 14 and the chuck 15, by means of which the cylindrical article to be cut is rigidly supported. The cylindrical member 8 has coaxially associated therewith the supporting members 16 and 17 which assist in maintaining the proper alignment between the article to be worked upon and the chuck 15 by which it is secured.

The side frame members 1 and 2 merge at their upper terminal portions into a sliding bed which, as shown in Fig. 4, is formed of a dove tail projection 18 which extends substantially longitudinally thereof and which is adapted to receive the complementary dovetailed recesses in the slide heads 19 and 20. The slide heads 19 and 20 are adapted to receive bolts 21 which secure the wedge members 22 thereto by means of which the slide heads are movably secured to the dove-tail elements 18 of the base. The slide head 19 has a projection 23 formed integrally therewith on its upper surface, and which is adapted to receive the bolts 24. The bolts 24 removably secure the clamp member 25 which is utilized to engage the cutting tool 26 to the slide head 19 so as to present the cutting tool in proper relation to the work to be cut. The slide head 20 has a substantial shoulder 21' formed thereon which in turn secures the terminal portions of the bolts 27 which, through the clamping member 28, secure the cutting tool 29 to this slide head. The shoulder 21' of the slide head 20 has a duct 30 formed therein, which terminates in a branch tube 31 and which is adapted to threadably engage the supply pipe 32 by means of which a suitable fluid is introduced to the cutting area.

Positioned intermediately of the side members 1 and 2, and rigidly supported thereby, are housing elements 33 and 34 which are adapted to receive the guide blocks 35 and 36 and the cylinders 37 and 38. These cylinders are secured in their respective housing elements by means of end plates 39 and 40 which are rigidly and removably secured to the housing members 33 and 34, respectively, by means of bolts 41. The slide heads 19 and 20, respectively have depending projections 42 and 43 formed integrally therewith which extend into the body of the mechanism, and which have apertures 44 and 45 formed therein adapted to receive the reduced terminal portions 46 and 47 of piston rods 48 and 49. The piston rods 48 and 49 pass through guide blocks 35 and 36 and are encompassed by gland members 50 and 51 which secure the packing 52 and 53, which packing serves as a means for preventing the escape of fluid around the piston rods as they pass through the guide blocks. The piston rods 48 and 49 have terminally secured thereto the pistons 54 and 55 which are formed with circumferential grooves 56 and 57 adapted to receive piston rings to more efficiently seal the pistons in the cylinders and enhance the efficiency of the mechanism.

Integrally formed with the depending projections 42 and 43 are projections 58 and 59 which are adapted to support the frictionless bearing elements 60 and 61. The frictionless bearing elements 60 and 61, respectively support the shafts 62 and 63, on which are mounted the link elements 64 and 65. The link element 64 is adapted to support the frictionally bearing element 66, which is coaxially mounted on the shaft 67. The element 64 has a projecting portion 68 formed integrally therewith, which is adapted to oscillatorily support the link 69 by means of the pin 70. The shaft 67 has revolubly supported thereon the terminal portion 71 of the cross link 72 and also revolubly supports the thrust block 73. The thrust block 73 is adapted to threadedly engage the terminal portion 74 of the adjusting rod 75. The adjusting rod 75 has a reduced terminal portion 76 which passes through segmental supporting elements 77 which are revolubly supported by the apertures 78 formed in the bosses 79 in the side frame members 1 and 2. The reduced terminal portion 76 of the thrust member 75 has secured thereto a thrust block 80, which is adapted to coact with the segmental members 77 and the shoulder 81 on the thrust member 75 to effect a lateral movement of the member 73 upon rotation of the thrust member 75 by means of the handle 82.

The link member 65 has centrally formed therein an aperture adapted to support the frictionless bearing element 83 which is mounted on the shaft 84. The link member 65 has its terminal portion 85 adapted to support the pin 86, which oscillatably secures the link 69. The shaft 84 revolubly supports the terminal portion 87 of the link member 72.

The alternative form of construction, as shown in Fig. 6, has the link members 88 and 89 which are comparable to link members 64 and 65 in Fig. 7, integrally united with the segmental gears 90 and 91, which are revolubly supported by means of the frictionless bearing members 92 and 93 on the shafts 94 and 95. Shafts 94 and 95 are interconnected by means of the link 96, which is comparable to link 72 in the above description. The thrust rod 75, which is threadedly engaged at its terminal portion 74 by the member 73, is in this figure shown to pass through the segmental supporting members 97 and 98, which are likewise oscillatably supported in the apertures 78 in the side frame members 1 and 2. This form of construction, however, shows a resilient means 99 acting upon the segmental member 98 and controlled by the adjusting screw 100, which varies the frictional resistance between the reduced portion 76 and the segmental supporting members 97 and 98, which offers a suitable means for varying this frictional resistance as the occasion may demand during the operation of the mechanism. It will be noted that the construction of the mechanism as illustrated in this figure is substantially the same as that described in connection with Fig. 7, so like indicating ordinals will be employed to designate like parts.

The bracket 103 which is rigidly secured to side member 1 has revolubly mounted thereon, the supporting member 101 by means of the pin 102. The member 101 has its terminal portion bifurcated as at 104 and adapted to receive the pin 105, on which is oscillatorily mounted the end of the member 106, more clearly shown in Figs. 1 and 2, which has its other terminal portion 107 formed into a handle and which, intermediately of its ends, carries a cutting tool 108. The cutting tool 108 is employed to remove the burr from the inside of the pipe which has just been cut off, this removal of the burr being accomplished before the pipe is again extended preliminary to cutting off a new length. The main bed of the machine has a trough-shaped member 109 extending laterally therefrom, which is adapted to deliver the cut-off portion of the pipe away from the machine.

The operation of the mechanism will now be briefly described. The pipe to be cut is secured in the chuck 15 with the proper length which is to be cut extending therefrom and overhanging the cutting mechanism comprising my invention. The pipe, whether it be of a large or small diameter, as shown in dotted outline in Figs. 6 and 7, projects intermediately of the slideheads 19 and 20. The slideheads are then moved toward the pipe to be cut by introducing suitable fluid means under pressure to the cylinders 37 and 38 through a source of supply, not shown, which fluid means will force the piston rods 48 and 49 toward the center of the machine at a relatively high speed until the cutting tools 26 and 29 come in contact with the pipe to be cut. The link connecting mechanism connecting shafts 62 and 63, as shown on Fig. 7, or the segmental gear mechanism connecting the same shafts, as shown in Fig. 6, will maintain the slideheads in proper relation with respect to the axis of the pipe and insure the proper relation in the speed and distance of the travel of each of the slideheads.

As the cutting tools 26 and 29 are brought into contact with the pipe it may be found that the pipe to be cut is somewhat out of alignment, necessitating an adjustment of the cutting tools with respect thereto in order to insure a proper functioning of each of the cutters. If it is found that the pipe is somewhat out of adjustment with respect to the cutters the proper alignment of the cutters with respect to the pipe may be accomplished by a rotation of the handle 82, which moves the entire sliding mechanism laterally either one way or the other, depending on the direction in which the adjustment is sought to be made. The means illustrated in association with the reduced end of the adjusting member 75, as illustrated in Figs. 6 and 7, maintain this adjustment at the point at which it has been set by means of rotating the handle 82.

With the cutters now properly positioned with respect to the pipe to be cut, that is, positioned so that the cutters bear against diametrically opposed points on the pipe with equal force, the fluid delivery to the cylinders 37 and 38 is reduced to the cutting speed. With the type of cutting tools commonly employed there is the possibility of one of these cutters acting upon the pipe to be cut in response to a different degree of pressure from what is required for the other cutter to effect the same depth of cut. For the efficient operation of a machine of the character described, it is essential that means be provided for equalizing the action of the several cutters on the rotating pipe. As the pipe rotates and the cutters move toward the axis thereof the movement of these cutters is equalized by means of either the link arrangement illustrated in Fig. 7 or the segmental gear construction illustrated in Fig. 6. These equalizing means, associated with the sliding heads, absolutely insure an equal and uniform action on the part of each of the cutters on the cylindrical article to be cut.

The equalizing means which has been described is also particularly advantageous from the standpoint of correcting any variations which may occur in the frictional resistance to the movement of the individual slideheads, which would cause a difference in the pressure that the tool carried by this slidehead would exert on the pipe as compared with the tool carried by the other slidehead which, for some reason or other, might have a lower or higher frictional resistance. Naturally, the equalizing mechanism will also correct any fluctuations or variations in the pressure as exerted on the several cylinders by which the separate slideheads are actuated.

It will be seen that the above described mechanism comprising my invention is especially applicable to cut off cylindrical articles made of high carbon steel or alloy which, due to their hardness, require a relatively slow cutting speed as well as a flexible feed for the cutting members. The employment of hydraulic means for actuating the cutting tools is likewise particularly applicable to the arrangement above referred to, by means of which the movement of the several cutting tools is equalized.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine for cutting off cylindrical articles and the like, the combination with means for rigidly and revolubly supporting said article to be cut, slideheads positioned adjacent said article adapted to move toward and away therefrom, cutting means for said article carried by said slideheads, separate fluid actuated means for respectively actuating said slideheads, means for adjusting said cutting means transversely of said article without varying their relative positions, and means for equalizing the rate of relative movement between each of said cutting means and said article.

2. In a machine for cutting off cylindrical articles, the combination with means for rigidly and revolubly supporting such article to be cut; of slideheads positioned adjacent said article adapted to move toward and away therefrom; cutting means for said article carried by said slideheads; means for supporting said slideheads; fluid actuated means for moving said slideheads; linked means interconnecting said slideheads for equalizing the movement thereof; and adjusting means for positioning said slideheads equidistantly from the axis of the article to be cut.

3. In a machine for cutting cylindrical articles, the combination with means for rigidly and revolubly supporting such article to be cut; of slideheads positioned adjacent said article adapted to move toward and away therefrom; cutting means for said article carried by said slideheads; a supporting bed for said slideheads; cylinders in said bed contiguous each slidehead; pistons in said cylinders connected with and adapted to move said slideheads; gear means interconnecting said slideheads for equalizing the movement thereof; and adjusting means for positioning said slideheads equidistant from the axis of the article to be cut.

Signed by me, this 3d day of December, 1929.

CLARENCE L. TAYLOR.